United States Patent

Wachob

[11] Patent Number: 5,231,494
[45] Date of Patent: Jul. 27, 1993

[54] SELECTION OF COMPRESSED TELEVISION SIGNALS FROM SINGLE CHANNEL ALLOCATION BASED ON VIEWER CHARACTERISTICS

[75] Inventor: David E. Wachob, Elkins Park, Pa.
[73] Assignee: General Instrument Corporation, Hatboro, Pa.
[21] Appl. No.: 772,927
[22] Filed: Oct. 8, 1991
[51] Int. Cl.⁵ .................. H04N 7/04; H04N 7/10
[52] U.S. Cl. ..................... 358/146; 350/86; 455/6.1
[58] Field of Search .......... 358/146, 86, 142; 455/61, 72

[56] References Cited

U.S. PATENT DOCUMENTS

| | | | |
|---|---|---|---|
| 3,639,686 | 2/1972 | Walker et al. | 380/10 |
| 3,975,583 | 8/1976 | Meadows | 358/146 |
| 4,573,072 | 2/1986 | Freeman | 358/146 |
| 4,602,279 | 7/1986 | Freeman | 358/86 |
| 4,805,020 | 2/1989 | Greenberg | 358/147 |
| 4,903,126 | 2/1990 | Kassatly | 358/146 |
| 4,967,273 | 10/1990 | Greenberg | 358/142 |

Primary Examiner—John K. Peng
Attorney, Agent, or Firm—Barry R. Lipsitz

[57] ABSTRACT

A plurality of television signals are transmitted and selectively received on a single television channel allocation. Headend apparatus compresses a set of television signals, such as a main program signal and a plurality of different demographically targeted commercials. The plurality of compressed television signals are combined into a combined signal for transmission on a single television channel allocation. A receiver receiving the combined signal identifies characteristics of a television viewer, and selects a particular one of the compressed television signals from the received combined signal depending on the viewer characteristics. The retrieved signal is decompressed for use by a video appliance.

11 Claims, 3 Drawing Sheets

SELECTION OF COMPRESSED TELEVISION SIGNALS FROM SINGLE CHANNEL ALLOCATION BASED ON VIEWER CHARACTERISTICS

BACKGROUND OF THE INVENTION

The present invention relates to television program distribution systems and apparatus, and more particularly to the provision of different commercial messages to different demographically targeted cable or satellite television audiences.

Viewers of commercial television are well aware that a typical television channel contains television programs with periodic commercial message breaks. Advertisers sponsor television programs by purchasing space for their commercials during the broadcast of the program. Although different commercials are often run for the same television program in different geographic areas, there have been no practical systems implemented to target specific commercials to specific television viewers on a case-by-case basis.

One prior art system proposed for targeting different messages to particular subscribers is disclosed in U.S. Pat. No. 4,602,279 entitled "Method for Providing Targeted Profile Interactive CATV Displays." The disclosed system requires the transmission of a common television message and a plurality of different multi-channel television messages over a plurality of contemporaneous channels. Since a plurality of television channels is required to carry the different messages, the proposed system does not make efficient use of the limited television frequency spectrum. For this reason, it is believed that the proposed system has not proven to be economically viable.

It would be advantageous to provide a bandwidth efficient method and apparatus for targeting specific commercial advertisements to demographically selected audiences. Such a system would enable commercial advertisements to be matched to specific television viewers, thereby more efficiently utilizing advertising budgets.

It would be further advantageous to provide such a system wherein a single television channel allocation carries a main television program chosen for viewing together with a variety of alternate commercial messages to be selectively retrieved during a commercial break depending on a current viewer's characteristics, such as the viewer's demographic profile.

The present invention provides such a method and apparatus.

SUMMARY OF THE INVENTION

In accordance with the present invention, apparatus is provided for transmitting and selectively receiving a plurality of television signals on a single television channel allocation. Headend apparatus for transmitting television signals includes means for compressing a set of television signals, at least two of which correspond to different viewer characteristics. The headend apparatus further includes means for combining the plurality of compressed television signals into a combined signal, and means for transmitting the combined signal on a single television channel allocation. Receiver apparatus receives the combined signal, and includes means for identifying characteristics of a television viewer. The receiver apparatus includes selection means responsive to the identifying means for retrieving a particular one of the set of compressed television signals from the received combined signal depending on the viewer characteristics. The receiver also includes means for decompressing the retrieved signal for use by a video appliance.

In an illustrated embodiment, the viewer characteristics comprise demographic data pertaining to a viewer. The set of television signals comprise a television program signal and a plurality of corresponding commercial message signals targeted to different viewer demographic groups. The selection means in the receiver are responsive to a commercial message break portion of the television program signal for selecting and retrieving commercials based on the viewer demographics.

Television receiver apparatus in accordance with the present invention comprises means for tuning to a television channel that carries a plurality of compressed television signals. Means are provided for identifying characteristics of at least one television viewer using the receiver. Means responsive to the identifying means retrieve a particular television signal from the plurality based on the identified characteristics. The receiver apparatus can further comprise means for decompressing television signals retrieved from the television channel for use by a video appliance.

The television receiver apparatus can further comprise means for retrieving a viewer selected television program from the plurality of compressed television signals. Means responsive to a message break signal carried by the viewer selected program are provided for actuating the retrieving means to retrieve a particular television signal during the message break. Means are provided for returning to the viewer selected television program at the conclusion of the message break.

Headend apparatus is provided for broadcasting a plurality of different messages for receipt by different television viewers depending on identified viewer characteristics. A plurality of television signals is compressed. The plurality includes at least one program signal and at least one alternate message signal. Means are provided for combining the plurality of compressed television signals for transmission within a single television channel allocation. The combining means combine the plurality of signals in a predetermined order to enable their retrieval depending upon viewer characteristics associated with the signals.

The headend apparatus can further comprise means for inserting a message break flag into the program signal to identify the occurrence of a message break in a television program carried by the program signal. The headend apparatus can further include means for transmitting a plurality of television channel signals. Each television channel signal contains at least one program signal and one alternate message signal in a corresponding single television channel allocation.

A method in accordance with the present invention reproduces different messages in a common television program received by a plurality of different television viewers. A single television channel is provided containing a compressed television program signal and a plurality of different compressed message signals. The different compressed message signals are identified with different viewer characteristics. The occurrence of a message break is detected in the television program signal. One of the compressed message signals is selected for reproduction during the message break at a particular viewer site, based on a correspondence between viewer characteristics identified for the site and viewer characteristics identified with the selected signal.

DETAILED DESCRIPTION OF THE INVENTION

A digital television transmission system has recently been proposed by the VideoCipher Division of General Instrument Corporation, San Diego, California. The transmission system, referred to as & DigiCipher TM, can deliver high quality video and audio services securely via satellite to cable television affiliates and directly to viewers having home satellite television systems.

The DigiCipher TM system allows digital transmission of one high definition television (HDTV) plus four digital audio signals, or two network quality National Television Systems Committee (NTSC) video signals plus eight digital audio signals, or four high quality NTSC plus sixteen digital audio signals, or ten VHS quality NTSC plus 20 digital audio signals on one C or Kuband satellite transponder.

The same technology can be used to compress and multiplex a plurality of separate television channel signals into one standard six MHz wide NTSC television channel. The present invention takes advantage of this feature to communicate a television program together with a plurality of commercial message choices in a single television channel. At a receiver, predefined viewer characteristics, such as demographic characteristics, are used as the basis for selecting one of the commercial message subchannels each time a commercial break occurs in the main television program carried on the particular television channel.

Figure 1:
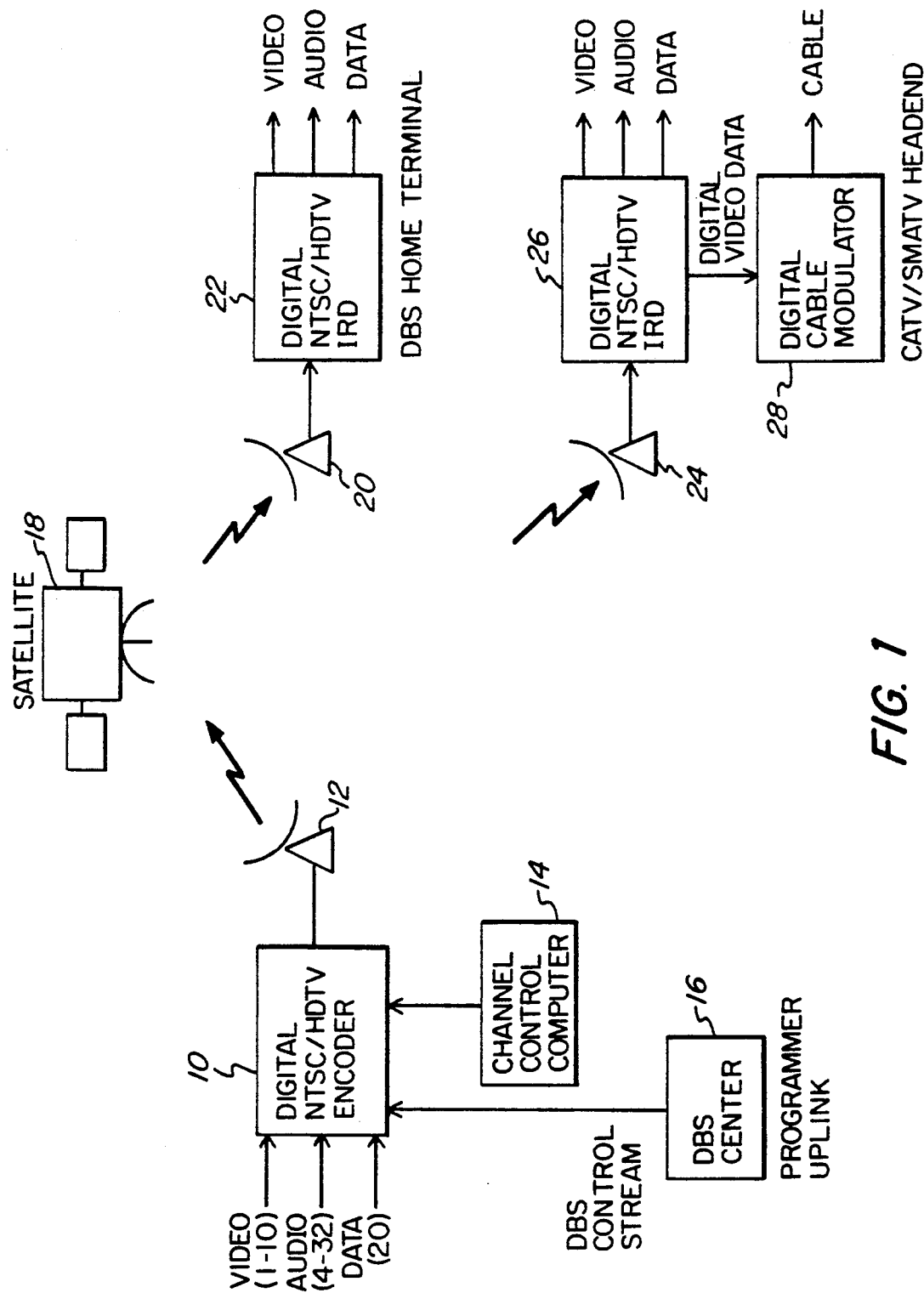
FIG. 1 is a block diagram of a satellite television signal distribution scheme in accordance with the present invention.

FIG. 1 illustrates the overall system block diagram. At the programmer's uplink, a digital NTSC/HDTV encoder 10 accepts multiple video and audio signals and transmits one quadrature phase shift keyed (QPSK) modulated data stream over a satellite link designated by conventional dish antenna 12 and satellite 18. A channel control computer 14 at the programmer's uplink formats each of the plurality of video, audio and data signals into a multiplexed data stream within a standard six MHz channel allocation for transmission. A direct broadcast satellite (DBS) center 16 provides authorization codes in a conventional manner to enable only authorized subscribers to intelligibly receive the television programs. If a subscriber has not paid for a particular programming service, the absence of authorization codes in the control stream will prevent the decryption and descrambling of the signals by the subscriber's satellite receiver.

Satellite 18 relays the signal for receipt by DBS home terminals and cable or satellite television headends that provide services throughout various geographic areas. Each DBS home terminal will have a receiving dish antenna 20 and an integrated receiver descrambler (IRD) 22 that receives the digital signal, descrambles the signal if authorized, and forwards separate video, audio and data outputs for use by the subscriber's television equipment. Each cable or satellite headend operator will receive the signal via a dish antenna 24. A headend IRD 26 outputs the video, audio and data signals for use, e.g., by satellite master antenna television (SMATV) subscribers. A digital cable modulator 28 is used by a cable television (CATV) system operator to distribute the received satellite signal to cable television subscribers via a cable television system. In this instance, the QPSK data stream will be directly carried over the cable to each subscriber location.

Key parameters of the DigiCipher TM system, implemented to provide either four (NTSC-4), eight (NTSC-8) or ten (NTSC-10) different television signals within each standard NTSC channel are listed in Table 1.

TABLE 1

| PARAMETERS | NTSC-4 | NTSC-8 | NTSC-10 |
|---|---|---|---|
| Sampling Frequency | | | |
| Luminance [MHz] | 9.68 | 9.68 | 9.68 |
| Chrominance [MHz] | 2.42 | 2.42 | 2.42 |
| Luminance Pixels Per Line | 615 | 615 | 615 |
| Active Pixels | | | |
| Luminance | 512 × 512 | 512 × 512 | 512 × 512 |
| Chrominance | 256 × 128 | 256 × 128 | 256 × 128 |
| VRAM Requirement [× 1 Mbit] | | | |
| Luminance | 4 | 4 | 4 |
| Chrominance | 1 | 1 | 1 |
| Total | 5 | 5 | 5 |
| Frame Rate | 29.97 | 29.97 | 29.97 |
| Active Pixel Rate [M Pixels/Sec] | 7.9 | 7.9 | 7.9 |
| Coding Rate [Bits/Pixel] | .82 | .31 | .31 |
| Video Data [Mbps] | 6.462 | 2.443 | 2.426 |
| Audio Data [Mbps] | 1.576 | 1.576 | .789 |
|  | (4 × .394) | (4 × .394) | (2 × .394) |
| Total Data Per Channel [Mbps] | 8.038 | 4.019 | 3.215 |
| Async Data & Closed Caption [Kbps] | 252 | 252 | 252 |
| Control Data [Kbps] | 252 | 252 | 252 |
| Total Data Rate [Mbps] | 32.658 | 32.658 | 32.658 |
| QPSK Symbol Rate [Mbps] | 21.477 | 21.477 | 21.477 |

The sampling frequency in the examples shown in Table 1 is chosen to optimize the video performance as well as to reduce the hardware complexity of the digital NTSC decoder by providing 512 active pixels. The chrominance component is subsampled by 4:1 horizontally and 2:1 vertically. The memory (VRAM) requirements are based on the use of 256K×4 (1 Mbit) VRAMs. The video data includes both luminance and chrominance data as well as various overhead information. The system has 256 Kbps control data channel per satellite transponder, regardless of the number of video services. The audio sampling rate is 35.85 KHz. In all cases, the total data rate is 32.658 MHz. After a rate ¾ forward error correction, the transmission data rate becomes 43.544 Mbps. Using QPSK modulation, the symbol rate becomes 21.479 Msps.

Those skilled in the art will appreciate that the parameters listed in Table 1 are examples only, and do not represent the only embodiments in which the present invention can be realized.

In order to achieve the objective of providing a plurality of television channel signals in a single 6 MHz channel allocation, the DigiCipher TM video encoding system can provide compression ratios of up to 75:1 for the 10 NTSC channel embodiment (NTSC-10). The compression process comprises six different subprocesses. These are a chrominance preprocessor, a discrete cosine transformation, coefficient normalization, prefiltering, statistical coding, and motion compensation. The digital video processing at the encoder is described in more detail below in connection with FIG. 3.

Figure 2:
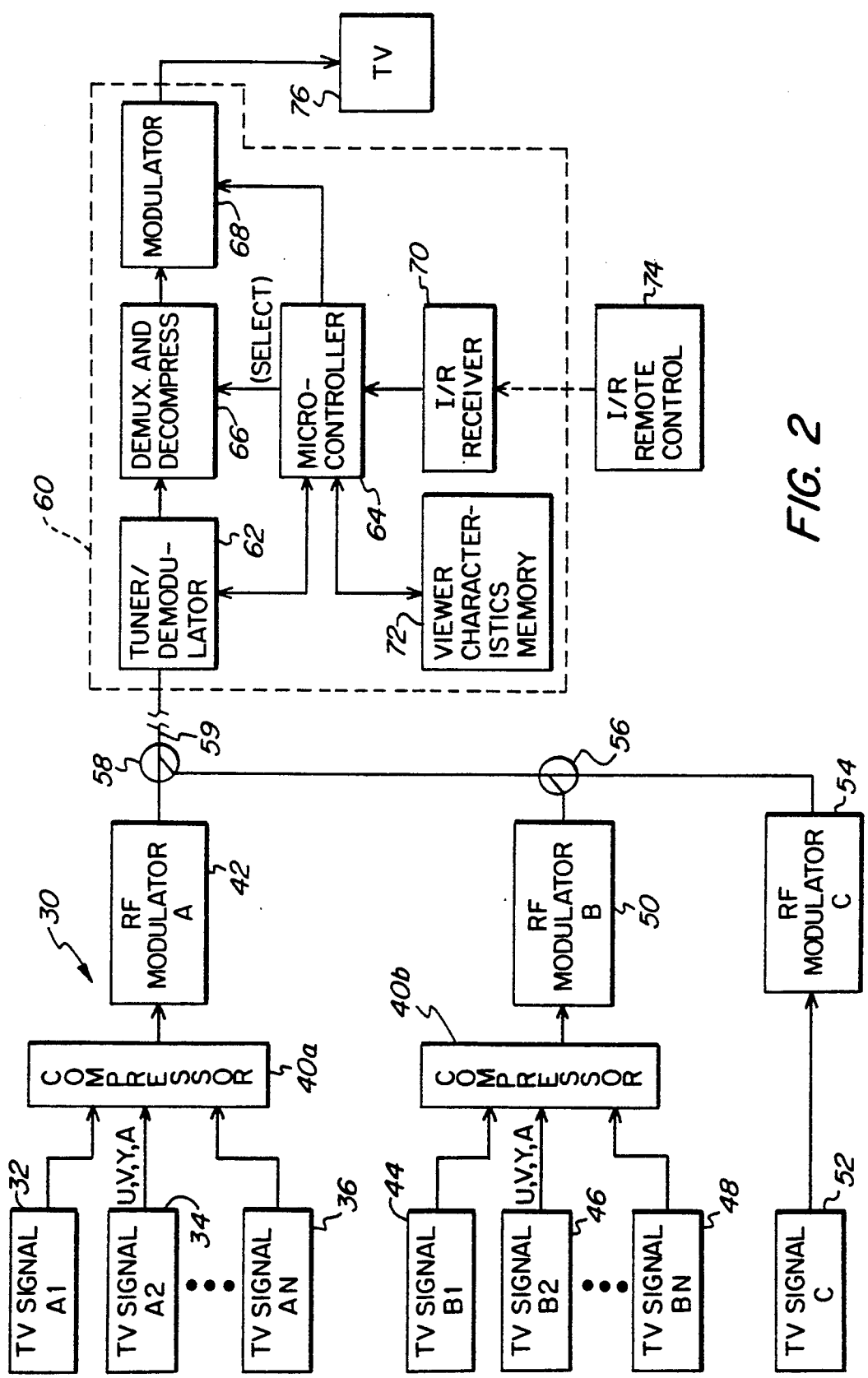
FIG. 2 is a detailed block diagram of a cable television implementation of apparatus in accordance with the present invention.

FIG. 2 is a block diagram illustrating the compression of various video sources, such as commercials and/or programs into a single RF channel for transmission in accordance with the present invention. The system includes a headend generally designated 30 that processes and transmits the signals, and a plurality of signal converters 60 (one shown) provided at each subscriber's location for receipt of the transmitted signals. Headend 30 includes a plurality of compressors 40a, 40b, each compressor corresponding to a different television channel to be transmitted via the cable or satellite distribution system. One of the compressors 40a illustrated in FIG. 2 receives N different television signals from a plurality of television signal sources 32, 34 ... 36. Each television signal source outputs U, V, and Y chrominance signals and an appended audio signal A that define the video and audio content of the particular television signal. The N signals are compressed and multiplexed in compressor 40a to provide a single data stream for transmission within the television channel allocation. The multiplexed data stream is modulated by an RF modulator 42 and output via a signal combiner 58 to the cable or satellite communication path 59, which distributes a plurality of channels to a subscriber base.

Additional channels of compressed and noncompressed television signals are also transmitted via the distribution link 59. In FIG. 2, an additional compressed channel is provided by compressor 40b, that receives N television signals from sources 44, 46, ... 48. The multiplexed data stream from compressor 40b is modulated by an RF modulator 50 and combined via a combiner 56 into the distribution link 59. One or more noncompressed RF channels can also be provided in the distribution stream. One such noncompressed channel is provided by television signal source 52, that provides a signal for modulation by an RF modulator 54.

As noted, the television channel output from each of RF modulators 42 and 50 contains a plurality of television program signals. In a preferred embodiment, one such signal, e.g., signal A1 from signal source 32 comprises a main television program, such as a television news program. Each of the remaining signals A2 through AN can comprise different commercials targeted to different demographic groups. Compressor 40a will add a control word to the individual commercial signals A2 ... AN that correlates the particular commercial with a demographic group. The main program signal A1 will contain data signifying that a commercial message break is about to occur in the program.

At each subscriber receiver 60, the data indicating that a commercial message break is about to occur is retrieved by a microcontroller 64. The microcontroller also obtains predetermined characteristics of the current television viewer from a viewer characteristics memory 72. The viewer characteristics can comprise, for example, demographic data such as the sex and age group of the current television viewer. In the event a plurality of viewers are currently watching the same television at the subscriber location, a prioritization algorithm can be executed to determine which of the viewers has priority. Based on the viewer characteristics, microcontroller 64 outputs a select signal to a demultiplexer and decompression circuit 66, causing one of the commercial messages A2 ... AN to be selected for reproduction at the subscriber location. The actual selection between signals A2 ... AN is made on the basis of the identifying data added to the signal at the headend by compressor 40a.

A tuner/demodulator 62 is provided in the subscriber terminal to select and demodulate the main television program that the viewer desires to watch. Thus, for example, if the viewer wants to view main program B1 instead of main program A1, the appropriate main program channel selection will be made via an infrared remote control 74 in a conventional manner. The selection entered into the remote control is detected by a conventional infrared receiver 70, that detects the user's selection and passes the detected data on to microcontroller 64 which actuates tuner/demodulator 62 to tune to the selected main program channel. After selection and decompression by demultiplexer and decompression circuitry 66, the main program signal and demographically selected commercial message signals are input to a modulator 68, where they are modulated for receipt by a conventional television receiver 76.

Figure 3:
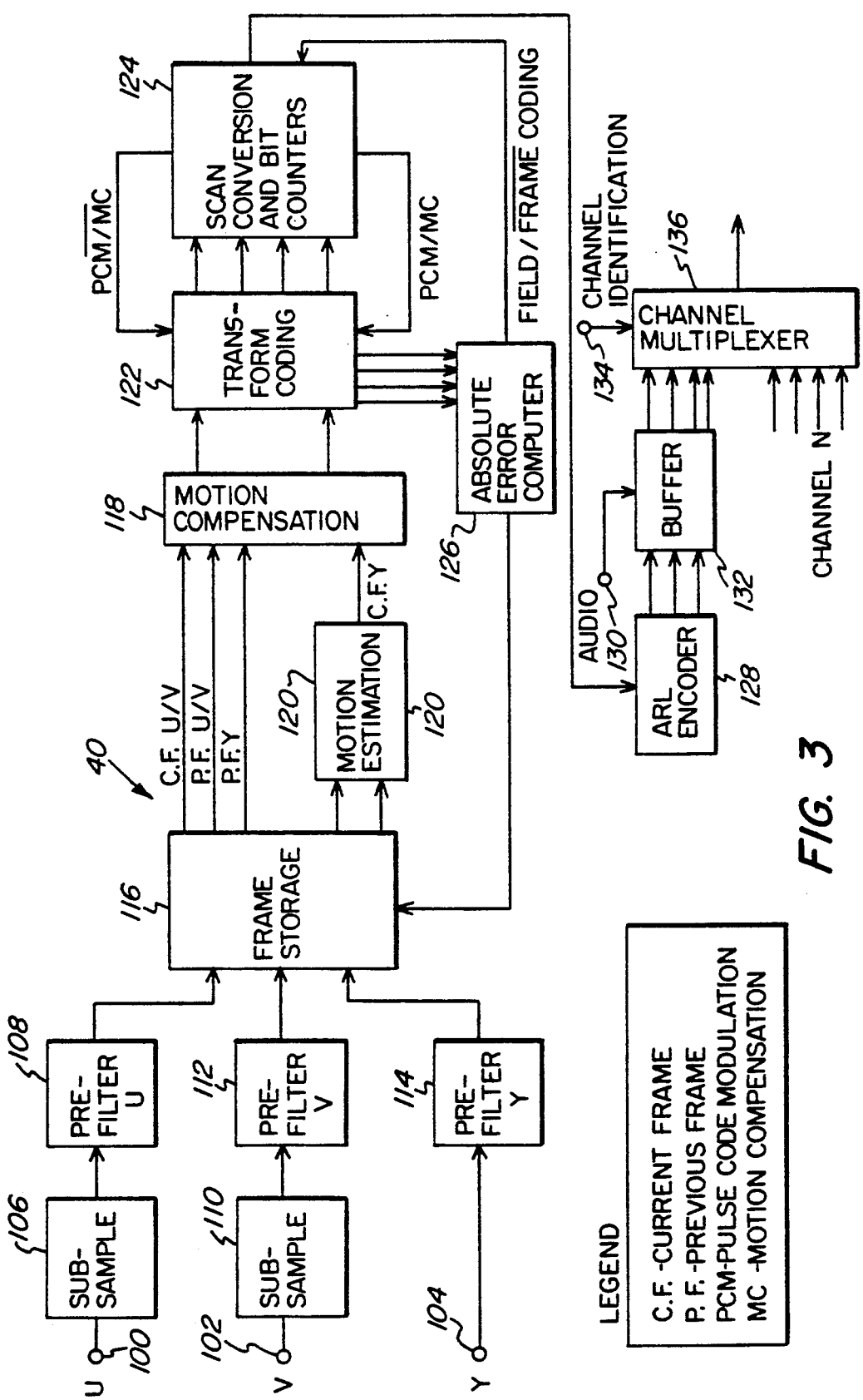
FIG. 3 is a block diagram illustrating an embodiment for the compressor subsystems illustrated in FIG. 2.

FIG. 3 illustrates an embodiment of the compressors used at the headend for providing a plurality of different television signals in a single channel allocation. The compressor provides chrominance subsampling, prefiltering, frame storage, motion estimation and compensation, transform coding, absolute error computation, scan conversion and bit counters, an amplitude/run-length (ARL) encoder, and a channel multiplexer. The resolution of chrominance information can be reduced relative to luminance resolution with only a slight effect on the perceived image quality. To take advantage of this phenomenon, each video input signal is first separated into luminance and chrominance components. The Y, U, V color space representation is used in the present embodiment. The U and V chrominance components are decimated horizontally by a factor of four and vertically by a factor of two. Typically, the horizontal resolution of chrominance in an NTSC signal is limited to 0.5 MHz (a reduction of 8:1). Therefore, the horizontal decimation does not introduce further degradation. This is the reason for the unequal horizontal and vertical subsampling ratios. The decimation requires the application of a prefilter prior to subsampling. Simple box car filters can be used, as well known in the art.

The luminance signal Y bypasses the chrominance preprocessor, and therefore full resolution is maintained. The chrominance components are then multiplexed with the luminance component, one block at a time, and all components are subjected to the same processing. At the subscriber's decoder, the components are again separated and the chrominance signals are interpolated back to full resolution.

The discrete cosine transform (DCT) is a well known algorithm that transforms a block of pixels into a new block of transform coefficients. For NTSC applications, a block size of 8×8 is adequate. The transform is applied in turn to every block until the entire image has been transformed. At the subscriber's decoder, the inverse transformation is applied to recover the original image. The DCT compression technique is described in greater detail in Chen and Pratt, "Scene Adaptive Coder," *IEEE Transactions on Communications*, Vol. COM-32, No. 3, Mar. 1984, which is incorporated herein by reference.

Coefficient normalization is a process that introduces small changes into the image in order to improve coding efficiency. This is done by truncating the DCT coefficients to a fixed number of bits. The truncation is performed by shifting a coefficient from left to right, spilling the least significant bits off the end of its register. In this way, the amplitude of the coefficient is also reduced. The number of bits remaining are preassigned individually for each of the 8×8 coefficients. However, the number of bits can be further reduced or increased as necessary to maintain a constant bit rate.

In some cases, it is better to sacrifice some image resolution rather than excessively quantize the transform coefficients. The easiest way to do this is to apply a two-dimensional low pass filter prior to the application of the DCT. By band limiting the signal, the amplitude of the high frequency DCT coefficients is effectively reduced, making the signal easier to compress without producing blocking artifacts. Gaussian filters can be used to provide such prefiltering.

Normalization and prefiltering both improve the compressibility of an image by reducing the amplitude of the transform coefficients. In order to take advantage of the result, an algorithm for assigning bits to these coefficients is required. In a preferred embodiment, a statistical coding technique is used, which unlike the normalization and prefiltering processes, is information preserving and therefore, does not degrade the image. One such statistical coding technique well known in the art is Huffman coding.

There is a limit to the amount of compression possible by spatial processing alone. An interframe coder, however, can benefit from temporal correlation as well as spatial correlation. A very high degree of temporal correlation exists whenever there is little movement from one video frame to the next. Even if there is movement, high temporal correlation may still exist depending on the spatial characteristics of the image. In the DigiCipher TM compression system, a signal is compressed by first predicting how the next frame will appear and then sending the difference between the prediction and the actual image. A reasonable predictor is simply the previous frame. This sort of temporal differential pulse code modulation (DPCM) encoding will perform very well if little movement occurs or if there is little spatial detail. At other times, it will be less effective and occasionally worse than if the next frame had simply been PCM encoded.

Motion compensation is a means of improving the performance of any temporal compression scheme when movement occurs. In order to apply motion compensation, it is first necessary to determine what has moved since the previous frame and where it has moved to. If this information is known at the decoder site, then the previous frame can be shifted or displaced in order to obtain a more accurate prediction of the next frame that has yet to be transmitted. The encoder would reproduce the same prediction as the decoder and then determine the difference between the prediction and the actual image. If the movements match the model used to estimate motion and if the motion estimates are accurate and the signal is free of noise, then this error signal would, in fact, be zero.

Turning now to FIG. 3 with this background, the compressor generally designated 40 includes input terminals 100, 102, 104 for each of the chrominance U, V and luminance Y components, respectively. At the input to the compressor, each frame is digitized into 512×512 pixels of eight bits each. The frame is assumed to be progressively scanned.

For U and V channels, a subsampling operation is provided by subsampling circuits 106, 110. All three channels are then prefiltered using two-dimensional Gaussian filters 108, 112, 114. A frame storage memory 116 contains four VRAM, where the prefiltered current frame and the coded previous frame are stored. The current frame is sent to a motion estimator 120 on a block-by-block basis. The corresponding search window is sent along with the current frame. The motion estimator executes a full search of pixels within the search window in accordance with well known techniques. A plurality of motion vectors (e.g., four) are generated for each block. A motion compensator 118 performs the motion displacement on the Y as well as the U and V channels. Current and previous frame pixels are output from the motion compensation stage.

The current frame pixels and previous frame pixels output from motion compensator 118 are input to a transform coding section 122 that performs the DCT operation on the current and previous frame pixels. In a preferred embodiment, the DCT operation is performed on four different cases; namely, PCM frame coding, motion compensated frame coding (DPCM), PCM field coding and motion compensated field coding. A decision to switch between PCM and motion compensation is based on the number of bits needed to code each block. The decision is made by bit counters provided in scan conversion and bit counter circuitry 124. A decision to switch between frame and field coding is made by an absolute error computer 126. This one bit decision will determine which kind of coded pixels is to be written back into the frame storage memory 116. It also controls the transform domain data going into the amplitude/run length (ARL) encoder 128. Therefore, the ARL encoder will code only the data that is to be transmitted. The encoded Huffman code words are stored in FIFO buffers 132 until they are read by a channel multiplexer 136.

Each separate television signal (e.g., signals A1, A2 ... AN shown in FIG. 2) is encoded with corresponding encoding circuitry such as that shown for one of the TV signals in FIG. 3. The television signal audio information is input to the corresponding buffer 132 via an audio input terminal 130. The various compressed TV signals are multiplexed in channel multiplexer 136, and coded to identify them via channel identification data input at terminal 134. The output of the compressor 40 is input to an RF modulator as indicated at modulators 42 and 50 in FIG. 2.

It should now be appreciated that the present invention provides a method and apparatus for reproducing different messages in a common television program received by a plurality of different television viewers. By compressing a main television program and a plurality of different commercial messages into a single television channel allocation, a simple decoder can be provided for reproducing demographically targeted commercials to different subscribers. The same apparatus can be used to select camera angles, game show options, and other variations for a main program carried in each television channel.

Although the invention has been described in connection with a preferred embodiment thereof, those skilled in the art will appreciate that numerous adaptations and modifications may be made thereto without departing from the spirit and scope of the invention, as set forth in the claims.

I claim:

1. Apparatus for transmitting and selectively receiving a plurality of television signals on a single television channel allocation comprising:
   headend apparatus for transmitting television signals including:
   means for compressing a set of television signals, at least two of which correspond to different viewer characteristics,
   means for combining the plurality of compressed television signals into a combined signal, and
   means for transmitting said combined signal on a single television channel allocation; and
   receiver apparatus for receiving the combined signal including:
   means for identifying characteristics of a television viewer,
   selection means responsive to said identifying means for retrieving a particular one of said set of compressed television signals from the received combined signal depending on said viewer characteristics, and
   means for decompressing the retrieved signal for use by a video appliance.

2. Apparatus in accordance with claim 1 wherein said viewer characteristics comprise demographic data pertaining to a viewer.

3. Apparatus in accordance with claim 2 wherein:
   said set of television signals comprise a television program signal and a plurality of corresponding commercial message signals targeted to different viewer demographic groups; and
   said selection means are responsive to a commercial message break portion of said television program signal for selecting and retrieving commercials based on the viewer demographics.

4. Apparatus in accordance with claim 1 wherein:
   said set of television signals comprise a television program signal and a plurality of corresponding message signals targeted to different viewer groups; and
   said selection means are responsive to a message break portion of said television program signal for selecting and retrieving messages based on the viewer characteristics.

5. Television receiver apparatus comprising:
   means for tuning to a television channel that carries a plurality of compressed television signals;
   means for identifying characteristics of at least one television viewer using said receiver; and
   means responsive to said identifying means for retrieving a particular television signal from said plurality of compressed television signals based on the identified characteristics.

6. Television receiver apparatus in accordance with claim 5 further comprising:
   means for decompressing television signals retrieved from said television channel for use by a video appliance.

7. Television receiver apparatus in accordance with claim 6 further comprising:
   means for retrieving a viewer selected television program from said plurality of compressed television signals;
   means responsive to a message break signal carried by said viewer selected program for actuating said retrieving means to retrieve said particular television signal during a message break; and
   means for returning to said viewer selected television program at the conclusion of said message break.

8. Headend apparatus for broadcasting a plurality of different messages for receipt by different television viewers depending on identified viewer characteristics comprising:
   means for compressing a plurality of television signals including at least one program signal and at least one alternate message signal; and
   means for combining the plurality of compressed television signals for transmission within a single television channel allocation;
   wherein said, combining means combine said plurality of compressed signals in a predetermined order to enable their retrieval depending upon viewer characteristics associated with said signals.

9. Headend apparatus in accordance with claim 8 further comprising:
   means for inserting a message break flag into said program signal to identify the occurrence of a message break in a television program carried by said program signal.

10. Headend apparatus in accordance with claim 8 further comprising:
    means for transmitting a plurality of television channel signals, each containing at least one program signal and one alternate message signal in a corresponding single television channel allocation.

11. A method for reproducing different messages in a common television program received by a plurality of different television viewers, comprising the steps of:
    providing a single television channel containing a compressed television program signal and a plurality of different compressed message signals;
    identifying said different compressed message signals with different viewer characteristics;
    detecting the occurrence of a message break in a television program represented by said compressed television program signal; and
    selecting one of said compressed message signals for reproduction during said message break at a particular viewer site based on a correspondence between viewer characteristics identified for said site and viewer characteristics identified with the selected signal.

* * * * *